United States Patent
McNeil

(10) Patent No.: US 7,159,059 B2
(45) Date of Patent: Jan. 2, 2007

(54) ULTRA-MODULAR PROCESSOR IN LATTICE TOPOLOGY

(76) Inventor: Donald H. McNeil, 726 Washington Blvd. #107, Williamsport, PA (US) 17701

(*) Notice: Subject to any disclaimer, the term of this patent is extended or adjusted under 35 U.S.C. 154(b) by 277 days.

(21) Appl. No.: 10/224,920

(22) Filed: Aug. 21, 2002

(65) Prior Publication Data

US 2003/0172221 A1 Sep. 11, 2003

Related U.S. Application Data

(63) Continuation-in-part of application No. 10/087,350, filed on Mar. 1, 2002.

(51) Int. Cl.
*G06F 13/00* (2006.01)
(52) U.S. Cl. ........................ 710/301; 710/305
(58) Field of Classification Search ........ 710/301–302, 710/305, 260–266; 709/201; 711/115; 712/10, 21, 28, 215; 713/193, 322, 400, 713/500, 502

See application file for complete search history.

(56) References Cited

U.S. PATENT DOCUMENTS

| | | | | |
|---|---|---|---|---|
| 3,308,436 A | * | 3/1967 | Borck, Jr. et al. | 712/10 |
| 4,775,246 A | * | 10/1988 | Edelmann et al. | 705/62 |
| 4,827,508 A | * | 5/1989 | Shear | 705/53 |
| 5,241,680 A | * | 8/1993 | Cole et al. | 713/322 |
| 5,475,645 A | * | 12/1995 | Wada | 365/222 |
| 5,623,637 A | * | 4/1997 | Jones et al. | 711/164 |
| 5,675,761 A | * | 10/1997 | Paul et al. | 711/4 |
| 5,687,346 A | * | 11/1997 | Shinohara | 711/130 |
| 5,822,784 A | * | 10/1998 | Garney | 711/208 |
| 5,872,960 A | * | 2/1999 | Oz et al. | 713/501 |
| 5,892,900 A | * | 4/1999 | Ginter et al. | 713/200 |
| 5,901,303 A | * | 5/1999 | Chew | 711/115 |
| 5,943,297 A | * | 8/1999 | Baker | 368/10 |
| 5,995,977 A | * | 11/1999 | Presler-Marshall | 707/104.1 |
| 6,078,967 A | * | 6/2000 | Fulghum | 710/2 |
| 6,128,720 A | * | 10/2000 | Pechanek et al. | 712/20 |
| 6,205,532 B1 | * | 3/2001 | Carvey et al. | 712/1 |
| 6,389,539 B1 | * | 5/2002 | Hamilton et al. | 713/200 |
| 6,457,099 B1 | * | 9/2002 | Gilbert | 711/115 |
| 6,480,935 B1 | * | 11/2002 | Carper et al. | 711/115 |

(Continued)

OTHER PUBLICATIONS

"Single-Board Intelligent Controller Performs Communications Tasks," Dec. 1978, Computer Design, p. 22.*

*Primary Examiner*—Rehana Perveen
*Assistant Examiner*—Nimesh Patel
(74) *Attorney, Agent, or Firm*—Lowe Hauptman & Berner, LLP; James J. Bindseil

(57) ABSTRACT

A Modular Operating Topology Element (MOTE), within a software-latticed network, implements ultra-concurrent operation of a plurality of such MOTEs, as single miniaturized packages, e.g., Compact Flash, each with a full function processor (CPU), a unique resident operating system, and dedicated applications. Internally accessed data and internal applications are invisible to the outside. A host external bus connection handles mass storage volumes, which support file-level data transfers. A software-latticed network of MOTEs defines a network element for a larger system. Multiple MOTEs operate concurrently in a non-hierarchical (ladder) interconnection using a circulating message exchange protocol with concurrent operation of the MOTEs. MOTE resident software mirrors inter-modular processor architecture, permitting support of concurrent processes with an exchange of messages circulated on a logical (software) bus. Each network MOTE is dedicated to a specific system function. Data and software programs can be kept secure against unauthorized access.

18 Claims, 9 Drawing Sheets

U.S. PATENT DOCUMENTS

| | | |
|---|---|---|
| 6,490,646 B1 * | 12/2002 | Leydier ............... 710/301 |
| 6,513,108 B1 * | 1/2003 | Kerr et al. ............ 712/19 |
| 6,597,362 B1 * | 7/2003 | Norman ................ 345/505 |
| 6,680,915 B1 * | 1/2004 | Park et al. ............ 370/254 |
| 6,728,862 B1 * | 4/2004 | Wilson ................. 712/14 |
| 6,754,784 B1 * | 6/2004 | North et al. ........... 711/145 |
| 2001/0002479 A1 * | 5/2001 | Asoh ..................... 711/115 |
| 2003/0065682 A1 * | 4/2003 | Nakajima ............... 707/200 |
| 2003/0101365 A1 * | 5/2003 | Elko et al. ............ 713/500 |

* cited by examiner

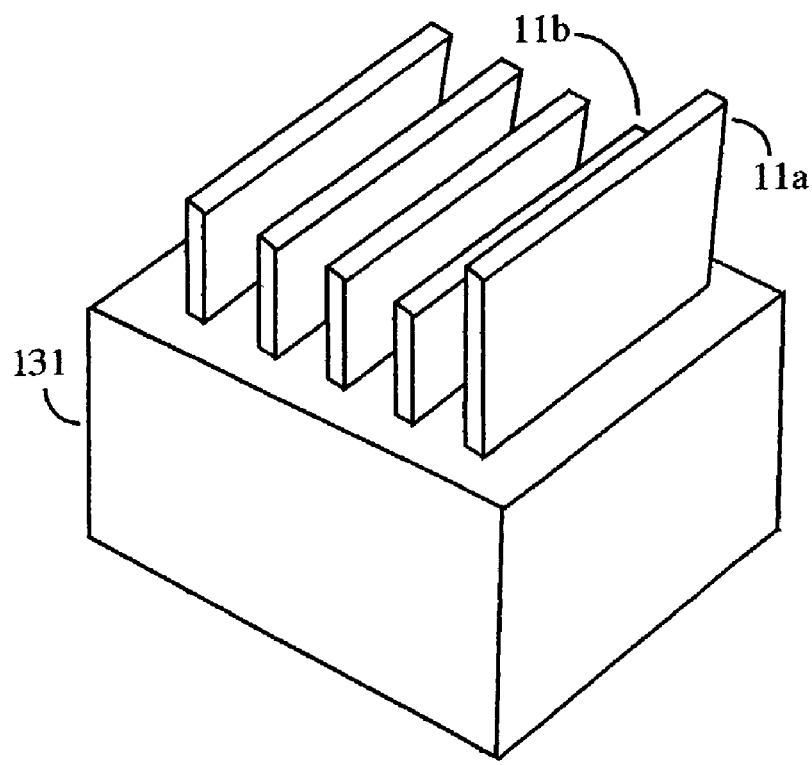
Figure 8
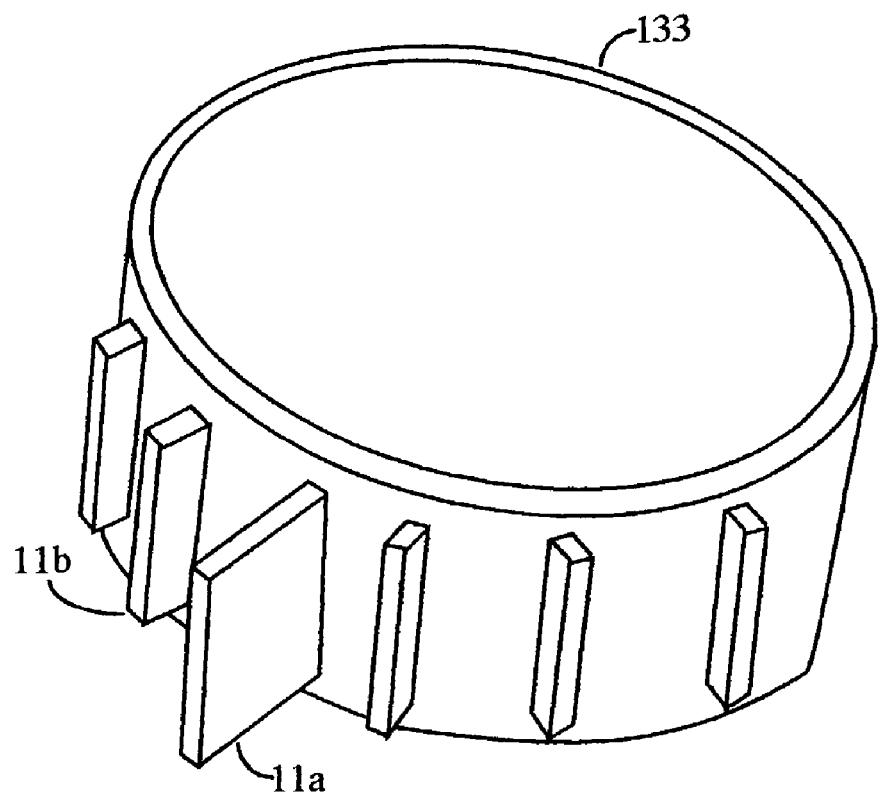

ULTRA-MODULAR PROCESSOR IN LATTICE TOPOLOGY

RELATED APPLICATIONS

This is a continuation-in-part application to pending U.S. patent application Ser. No. 10/087,350, filed Mar. 1, 2002, and titled Ultra-modular Processor in Lattice Topology.

BACKGROUND OF THE INVENTION

This invention relates to micro-computing systems and the management of miniature self-contained processors with data storage capability assembled in arrays. The invention further relates to such arrays or lattices of miniature processors with the capability of providing a files-and-folders interface in a prevailing format to host equipment such as personal computers, personal digital assistants (PDA), global positioning systems (GPS), digital cameras, mobile telephones, appliances, instruments, vehicles, etc.

The use of multiple processors, prior to their miniaturization, has taken various paths. Logue, et al., in U.S. Pat. No. 4,268,908, show a modular microprocessor system with plural programmed logic arrays connected to a bus system for macro-processing. Each logic array executes a specific instruction beyond the standard set of instructions.

Hailpern, et al., in U.S. Pat. No. 4,881,164, use a plurality of microprocessors assembled in an array with each controlling a respective area of a large memory. Barker, et al., in U.S. Pat. No. 5,842,031 also use memory element processor arrays. These concepts have been expanded into single instruction multiple data (SIMD) architecture by Dieffenderfer, et al., in U.S. Pat. No. 5,822,608 and Meeker, et al., in U.S. Pat. No. 6,067,609.

With the advent of smaller non-volatile memory, such as non-volatile ROM and EEprom memory cells, pluralities of individual memory cells have been arranged in blocks to constitute an array. The circuit shown by Takashima, in U.S. Pat. No. 5,903,492, uses a microprocessor to perform processing; and has an input/output device with data storage connected to the microprocessor. The microprocessor is also connected to a semiconductor memory device including a plurality of memory cells each having a transistor gate and a ferroelectric capacitor.

Wallace, et al., in U.S. Pat. No. 5,867,417, uses computer memory cards densely packed with a large number of flash EEprom integrated circuit chips thereon. The Wallace computer memory system provides for the ability to removably connect one or more of such EEprom carrying memory cards, to a host computer system through a common controller circuit that interfaces between the memory cards and a standard computer bus. Wallace also can provide each card with its own individual controller circuitry, which then makes it connectable directly to the host computer system's standard bus, without the need for a common controller circuit interface unit.

Microprocessors have been assembled in lattice structures, and other such arrays, by Klingman, in U.S. Pat. No. 6,021,453, which shows an indefinitely extensible processor chain with self-propagation of code and data from the host computer end of the chain Klingman has assembled a general purpose microcomputer with an "upstream" bus and a "downstream" bus. Klingman's upstream bus interfaces an integrated multiport RAM that is shared between an upstream processor and a local (downstream) processor. Local (downstream) interrupts are associated with dedicated locations in RAM. Klingman proposes arrays of such processors under the control of the host computer, wherein an indefinitely long chain of such processors can be utilized by one host computer.

Rohlman, et al., U.S. application publication No. 20010032307, shows a microinstruction queue for an instruction pipeline within a microprocessor system. The pipeline has a plurality of units each with certain processing capabilities. At least one of the pipeline processing units can receive instructions from another pipeline processing unit, store the instructions and reissue at least some of the instructions after a "stall" occurs in the instruction pipeline.

Further, Nakano, in U.S. Pat. No. 6,021,511, shows a processor with a plurality of execution units integrated into a single chip. The execution unit has an initial failure signal output device and a separate operating failure detection device. These devices each provide a respective failure signal in the presence of such failure in that unit. Failure signals are monitored by an allocation controller, which allocates instructions only between non-failed units.

Clery, in U.S. Pat. No. 6,079,008, shows a parallel processing system processor with a plurality of execution units to repeatedly distribute instruction streams within the processor via corresponding buses. Clery uses a series of processing units to access his buses and to selectively execute his distributed instruction streams. His processing units individually may select and execute any instruction stream placed on a corresponding bus. These processing units autonomously execute conditional instructions, e.g., IF/ENDIF instructions, conditional looping instructions, etc. An enable flag within a processing unit is utilized to indicate the occurrence of conditions specified within a conditional instruction, and also to control the selective execution of instructions. An enable stack is utilized in the processing and execution of nested instructions.

These prior devices and systems, however, utilize multiple processors for such technical reasons as to increase the throughput of a centralized computing facility under control of system hardware and software. As will be demonstrated below, it is the object of the present invention rather to provide highly independent, self-contained, and concurrent processing and data storage in the form of a peripheral attachment to host devices in a miniature package while presenting to any host having a compatible external bus an image of a passive mass storage volume, configuration of such devices to be under control of end users.

Such passive memory devices include compact flash (CF) and other such passive memory devices, which are connected to host system buses through CF card adaptors, such as shown by Yotsutani in U.S. Pat. No. 6,109,931 and PCMCIA adaptors, such as shown by Moshayedi in U.S. Pat. No. 5,660,568. These CF devices have been connected individually such as shown by Tsai in U.S. Pat. No. 6,009,496, and into flash EEPROM memory system arrays. These arrays of passive memory devices have been connected to memory addressing controllers such as those shown by Harari et al, U.S. application publication No. 2001/0026472 A1 and US 2001/0002174 A1 or to controllers such as shown by Tobita in U.S. Pat. No. 6,275,436 B1. At times block memory addressing has been used as shown by Shinohara in U.S. Pat. No. 5,905,993, These CF and other memory devices are completely passive, being without any active computing element (CPU), which CPU is capable of supporting an operating system or executing application programs within a self-contained miniature module. While as stated above, the prior art has contemplated distributed intelligence, it has not contemplated distributed intelligence masquerading as passive memory.

A second object of the present invention is to provide a miniature modular computing device for performing independent and concurrent computations, data storage, and input-output operations when attached to a host.

A third object of this invention is to provide this computing device with its own proprietary software and a self-contained operating system that enables it to operate as an intelligent media device, while presenting a passive virtual storage image to a host.

A further object of this invention is to provide this computing device where the projected look of a passive memory module effectively shares a virtual mass memory storage space within the device, while multiprogramming from that shared memory space concurrently with it being accessed from outside by a host.

A second further object of this invention is to provide lattice architecture for running proprietary operating system software permitting the interconnection of a plurality of these computing devices to operate as ultra-modular parallel processing units in relationship to one another and to have standardized interconnection hardware and software protocol to a host.

A third further object of this invention is to provide a secure and reliable means for packaging, delivering, and running proprietary software applications in a self-contained miniature module complete with a computing element (CPU), I/O circuits, an operating system, application program(s), and internally stored data.

A fourth further object of this invention is to provide a reliable and securable means for packaging and delivering and/or for collecting application-specific and/or private and/or proprietary data in such a way as to prevent unauthorized access, improper modification, and tampering via a self-contained miniature module complete with a computing element (CPU), non-volatile storage, I/O circuits, an operating system, application program(s), and internally stored data with minimal exposure to copying, tampering, software piracy, and other misuse.

A fifth further object of this invention is to provide a means for storing files and folders of computer data within a self-contained miniature module complete with a computing element (CPU), non-volatile storage, I/O circuits, an operating system, application program(s), and internally stored data wherein the said computing element and its software may continually monitor and/or scan said files and folders in said non-volatile storage to maintain the integrity of said data against damage, corruption, contamination, and the effects of computer viruses.

A sixth further object of this invention is to provide a means to substantially enhance the reliability of computer software applications by distributing and running said applications in highly independent, non-interfering modular units each having a self-contained miniature module complete with a computing element (CPU), non-volatile storage, I/O circuits, an operating system, application program(s), and internally stored data.

An even further object of this invention is to provide the proprietary operating system software for the lattice network of plural computing device with the ability to configure the computing devices in scalable and dynamically end-user re-configurable combinations of units forming a self-contained parallel processing and data storage system.

SUMMARY OF THE INVENTION

The objects of the present invention are realized in miniaturized self-contained hot-pluggable and physically dismountable computing system herein called a Modular Operating Topology Element (MOTE) typically imbedded in package similar in size to a Compact Flash™ (CF) unit or a PC Card, SmartMedia™ Memory Card, Multi-Media Card™ (MMC) or other such package, although somewhat larger packaging may also be used in order to accommodate more powerful computer circuits and/or multiple peripheral I/O ports. Further, the objectives of the present invention are realized in an array of such miniaturized self-contained computing systems and a method for logically interconnecting and managing the operation of such array as a smart lattice network.

Each MOTE, as for example, a 50 pin CF-sized package, has imbedded within it a programmable processor (CPU) with operating capabilities at least equivalent in memory addressing and interrupt handling facility to a Motorola® 68xxx processor. An internal hardware bus is connected to the CPU. Non-volatile random access memory (RAM) is connected to the hardware bus and provides working memory and mass storage memory for the device. Non-volatile read only memory (ROM) is also connected to the internal hardware bus and contains the dedicated operating system for the CPU, the software drivers for I/O attached to the device, and (optionally) application program code and data. A battery-backed real time clock-calendar unit is connected to the CPU through the hardware bus. Exception control circuits attached to the internal hardware bus provide for program-settable interval timer interrupts and watchdog timer interrupts to the CPU. Host interface I/O circuits connect the internal hardware bus to an external bus port for communication with an external computing system (host) hardware bus, e.g., PCMCIA bus, CF™ bus, SmartMedia™ bus, MMC™ bus, USB, IEEE 1394 (Firewire®) or other. The MOTE device may also optionally include I/O interface circuits for connection to one or more peripheral devices external to itself, e.g., for LED indicator lamps, for manual switches, or for serial, parallel or USB I/O, or other.

The device internal RAM module has within it a MOTE software-controlled allocation of both workspace memory for the MOTE's internal processing and a Virtual Mass Storage Control (VMSC) region, both of which are implemented under the control of the MOTE CPU and its operating system. All access to memory within a MOTE is via MOTE software which emulates a passive mass storage volume interface upon the host bus, i.e., a host is presented with an image of the MOTE device as a virtual passive mass storage volume (in prevailing standard files-and-folders format, e.g., MS-DOS FAT 16, etc.) which it can only access under control of the interface emulation software within the MOTE. All application-level interactions between a host and a MOTE are conducted at the files-and-folders level, i.e., by the reading and writing of files in the VMSC which is logically shared by the host and the MOTE under the strict and exclusive control of the MOTE software. Data stored within a MOTE may optionally be hidden from the host and accessed only by the software within said MOTE.

Process management software within a MOTE is implemented in the form of a (non-Windows®, non-MacOS®, and non-UNIX) proprietary operating system to provide the services required to manage the MOTE CPU and the applications which run thereupon. CPU applications software may be written in any compatible language, such as the C or C++ languages. The operating system within each MOTE manages multiple logically concurrent logical processes as a circulating logical bus, with priority queues and unique addressing for each specialized logical process internal to it. Among the logical processes are those dedicated to MOTE operating system internal processing, to host bus management, to scheduling application events using the internal real-time clock-calendar circuits, to MOTE application software, to handling exceptions such as power-fail and warm-start, and to management of (optional) external port peripheral device communications.

A plurality of MOTE devices may be assembled into a host software-controlled lattice topology architecture, in which the MOTE internal soft-latticed topology becomes a system element or plural system elements for a larger host system wherein MOTE devices attached in parallel to a standard hardware external bus, e.g., CF or USB, receive messages in files written into their respective VMSCs by the host, then process those messages and return the results in files they write into their own respective VMSCs. Implementation of the soft-latticed topology between a plurality of MOTE units connected within the lattice topology is thus effected by the operation in a host of a circulating logical bus algorithm similar to that of a MOTE. The process management of the lattice topology system emulates the fundamental ultra-modular multiprocessing algorithm implemented within a MOTE, but on a hardware external bus so as to implement the lattice topology at the system level. At this level, the algorithm addresses individual MOTE processing unit operations within the lattice topology, as opposed to logical process functions within a MOTE environment.

The invention permits logically concurrent processing at the MOTE level and physically concurrent processing at the system lattice topology levels. Process management at the system lattice topology level may be handled by a MOTE dedicated to that function and acting as a host if no other form of host is available. Re-configuration and re-sizing of systems of MOTE devices in a system level lattice topology are done at will by an end user by "hot-swapping" idle MOTE units, and the operating systems of a host and one or more MOTEs respectively automatically recognize such changes in subsequent operation. In particular, the operating system within a MOTE receives a power-fail interrupt when the MOTE is unplugged from an external host bus and saves the internal status of its operations so that it can automatically resume operation when it is plugged in again to a host external bus.

BRIEF DESCRIPTION OF THE DRAWINGS

The features, advantages and operation of the present invention will become readily apparent and further understood from a reading of the following detailed description in connection with the accompanying drawings, in which like numerals refer to like elements, and in which:

FIG. 8 shows two examples of hubs which accommodate multiple physical MOTEs in parallel.

DETAILED DESCRIPTION OF THE INVENTION

Figure 1:
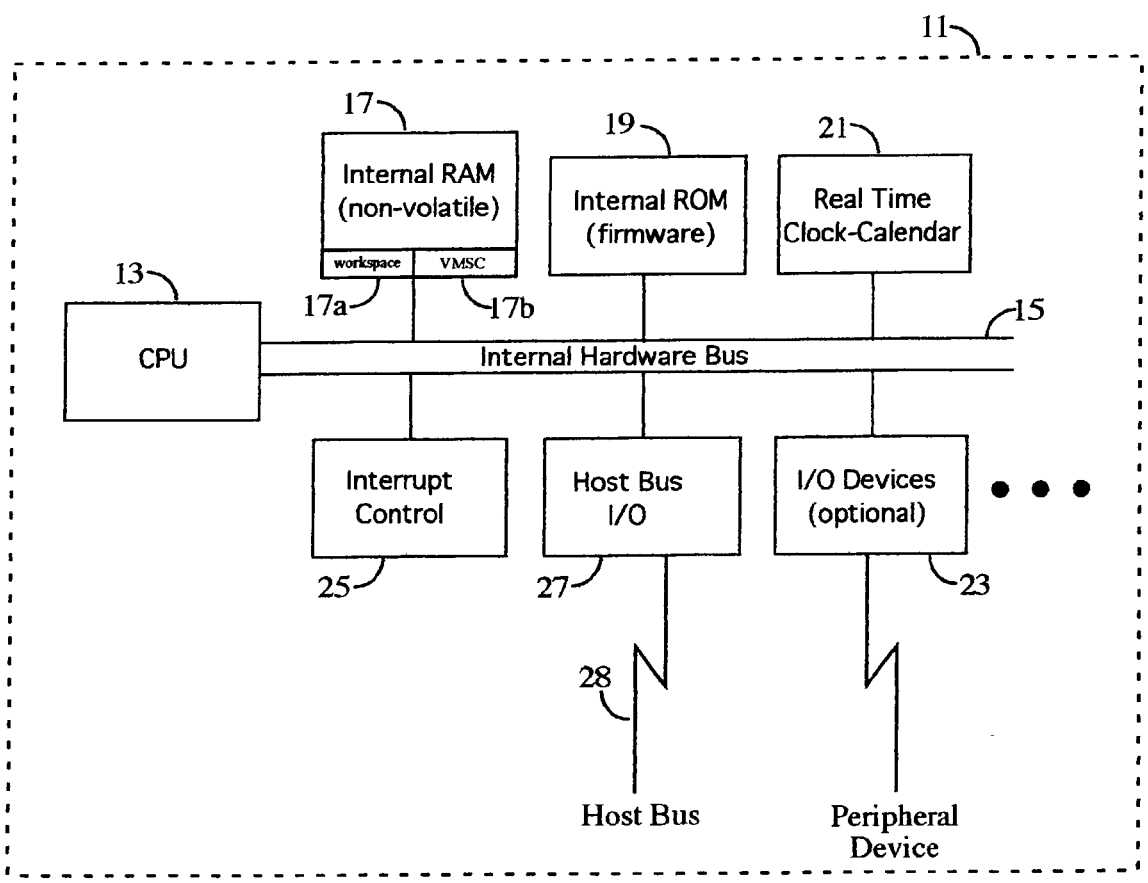
FIG. 1 is a functional block diagram of a modular operation topology element (MOTE)

The present invention provides a hot-pluggable and physically dismountable modular computing device herein called a Modular Operating Topology Element (MOTE) for performing independent computations and/or input-output I/O functions to operate as an attachment through a standard interface to a host system. A MOTE resides within a miniaturized package, typically having a form factor compatible with a prevailing standard such as a Compact Flash™ (CF) unit, a PCMCIA Card, a SmartMedia™ Memory Card, a Multi-Media Card™ (MMC) or other such package. Somewhat larger packaging may alternatively be used in order to accommodate more powerful computer circuits and/or multiple peripheral I/O ports.

A MOTE unit can be programmed to function as an intelligent media device, a specialized processing device, a smart controller for peripheral input/output, or any other computer function whatsoever. A logically parallel software scheme is used to interconnect a plurality of such miniaturized packages into a network having a lattice topology. Application software resides in one or more MOTE devices operating in parallel and concurrently. Host accessible externally distributed mass storage of data and computing resources can be distributed among a plurality of MOTE packages. All access by a host to the application functionality of a MOTE is through the reading and writing of files in the Virtual Mass Storage Control (VMSC) of the MOTE. In addition to non-volatile memory for mass storage, each package includes a self-contained processor (CPU), a dedicated operating system, application software, and internally stored data. This latter structure operates in conjunction with device internal memory to project a passive ("dumb") virtual mass storage logically formatted as files-and-folders in a prevailing standard format seen by any externally connected host system.

The physical architecture of a software-latticed network of MOTE units is re-configurable and re-scaleable externally at will by end users simply by plugging in and unplugging the units to a host external bus, e.g., PCMCIA or CF or USB, and configurations are automatically recognized internally by software within the host and the MOTEs respectively. The processing functions of MOTE may be changed by programming. In the absence of any other kind of host, one MOTE within the latticed network may perform the functions of the host bus operations controller. Other MOTE devices may be programmed to serve as specialized applications processors and as peripheral device controllers. Address queuing for each MOTE is established within the lattice. The operations controller implements ultra-modular and concurrent processing operations within the lattice architecture of a plurality of MOTEs. Data are made available to each MOTE as logical messages in files written to the MOTE's Virtual Mass Storage Control (VMSC), and results produced by the MOTE, including messages to be forwarded to other MOTEs, are returned in files which it creates on its own VMSC. A non-hierarchical ladder interconnection topology can be implemented with re-circulating message exchange protocol.

As each modular computing device operates independently, it has the ability to interact with a host asynchronously through the independent storage of "files" and "folders" data via the Virtual Mass Storage Control (VMSC) protocol resident within each unit. VMSC appears on any host external bus as a passive mass storage volume containing files and folders in, e.g., a prevailing standard format, such as MS-DOS FAT 16 etc. Generally, speed of interaction between a host and a MOTE is determined by the following factors: host speed, host software speed, bus speeds, MOTE circuit speeds, and MOTE software speed.

The hardware and software within the MOTE strictly controls all access to all data in its non-volatile storage. The independence and the integrity of the operation of each MOTE unit is maintained by restricting the access of the host to the MOTE to the reading and writing of files and folders resident in the VMSC of said MOTE. In some applications, data will be transferred from a host to a MOTE as bulk files for processing as a batch, and the MOTE will return results in files; in other applications one or more files in the VMSC of a MOTE may be used quasi-conversationally, i.e., kept open for continual reading and writing. Because a MOTE can read and write its own VMSC directly, it can expedite conversational interactions, e.g., between a word processor application operating in a MOTE and a shell driver operating in the host, so that interaction with an end user of the host need not be delayed by the host/MOTE interface, depending upon the speed of the circuits and the efficiency of the software in the respective units.

The data capacity of an individual MOTE unit may range from megabytes to gigabytes, depending upon the non-volatile memory technology available, the addressing structure of the host bus, the total amount of non-volatile storage manufactured into a particular MOTE unit, and the requirements of the MOTE's application. A MOTE unit may be delivered with application-related data pre-loaded into its non-volatile storage and/or data may be acquired and stored therein during use. Such data may include programs to be executed by the MOTE processor as well as variables, parameters, files, and data bases. Whatever the source or manner of use, said data is stored in one of three software-determined ways: in files and folders format in VMSC accessible to both the application and to the host bus interface (either modifiable or read-only from the host); in files and folders format but accessible only to the application within the MOTE unit; and in a format optimized to the MOTE's application, for example, as a directly accessible binary tree index. In any event, all access to and updating of data in the non-volatile storage of a MOTE unit is under strict control of the processor, the operating software, and the application software within said MOTE unit, thus making it possible to deliver and/or to collect application-specific and/or private and/or proprietary data and to protect said data from unauthorized, illegal or otherwise improper access and/or modification from outside the MOTE unit. Data in non-volatile storage may include software programs which can be kept inaccessible there from access by the host bus so as to be effectively protected against unauthorized modification, software piracy, and other misuse. Also, the MOTE computing element and its software may continually monitor and/or scan data, files, and folders within the non-volatile storage of said MOTE to maintain the integrity of the data therein against damage, corruption, contamination, and the effects of computer viruses.

Each MOTE acts as a modular operating topology element to provide a convenient, small and standardized physical package, with full and immediate high-level compatibility with existing hardware and software host devices, such as desktop computers, laptop computers, personal digital assistants (PDA), global positioning systems (GPS), digital cameras, mobile telephones, appliances, instruments, vehicles, and any other devices which can support a standard external bus interface to virtual mass storage volumes. Each MOTE projects itself via VMSC as a virtual passive storage volume and is available for off-loading and parallel concurrent operation of application programs with exchange of data with a host system. Because of its own imbedded operating system, dedicated applications software, and internally stored data, each MOTE is highly independent from the host operating system and from all of the software and hardware of any connected host except for the host external hardware bus and the host software drivers for that bus, both of which already meet prevailing external standards. With the soft-lattice architecture and its operations control, MOTE internal hardware and software, including management of the MOTE's internal soft-lattice architecture and its internal control of software processes, is entirely invisible to and inaccessible by any host or other external agent.

The utilization of such modular computing device (MOTE) provides a cost-effective and reliable computing and data storage structure with extensibility of computing functions and of other capacities at will by end users. This extensibility is implemented simply by substituting or adding or removing MOTEs, which is possible as they are each standardized, interchangeable, self-contained units. Each MOTE being suited for modularity can therefore be easily assembled in arrays connected to standardized external bus connections (both connectors and connection protocol).

Each MOTE incorporates a computing element (CPU) and related circuits having functionality comparable to a Motorola® 68xxx unit. The simplicity of the logically concurrent processing implemented in MOTE internal software lends to efficiency and reliability without need for the burdensome complications of large, monolithic software operating systems such as Windows® or MacOS® or UNIX. The duplication within each MOTE device of computer hardware together with operating system and application software and internally stored data, the highly independent operation of MOTE units, the complete inaccessibility to tampering from outside with the MOTE internal hardware and software, plus the abilities to be re-configured at will, to automatically restart after any power failure, and to recover from a variety of internal failures lends to an ultra-reliability of a MOTE deployed alone or in a soft-latticed network. The possibility of retrospective examination of data in VMSC files in a MOTE, including any such log files as a MOTE application may keep, also lends to ease of troubleshooting.

From a functionality standpoint, an individual MOTE unit, packaged for example with the form factor of a compact flash (CF) sized unit, is customized by the application software and internally stored data delivered within it. This software and data enable a MOTE to perform as a highly independent unit to deliver, to carry, and to execute proprietary software and/or other downloaded software, operating fully in parallel and concurrently with a host and/or other MOTE units. Having received an input and associated data in files written by the host into its Virtual Mass Storage Control (VMSC), which appears to the host as a passive mass storage volume in a prevailing standard files-and-folders format, the MOTE performs the functions of the application software then resident within it. Said functions may include access to data held internal to a MOTE and not accessible to the host. It then provides a response into one or more files in its VMSC without requiring intervention by any host specific software. MOTE operations are independent of host processing time and are carried out without exposing the MOTE resident proprietary software to the host in any way whatsoever. Because software programs within a MOTE may be resident in ROM or in non-volatile RAM workspace which is not accessible to the host, software delivered with or updated into a MOTE is effectively protected from illegal copying, tampering, software piracy, and other misuse. For extra integrity of data in its VMSC, the software in a MOTE may monitor and/or scan files and folders in its VMSC to avert damage to data due to corruption, contamination, and the effects of computer viruses. Because the only access by the host to a MOTE is through files in a MOTE's VMSC, which is under strict control of the MOTE internal software, and because the MOTE cannot access the host except by posting files to it in its won VMSC, both host and MOTE are highly isolated from one another, leading to greatly enhanced reliability as well as to effective partitioning of functionality.

Because a MOTE may optionally have one or more external I/O interfaces other than that to the host external bus, it may with proper internal applications programming and internally stored data serve as a highly independent and concurrent peripheral processor to perform I/O functions to and from peripheral devices, e.g., through a serial port cabled to legacy devices or through a USB port to contemporary devices. In such an application, a MOTE can transfer data from files written to its VMSC by a host out through a peripheral interface and can store into files in VMSC any data received from that external interface, thereby making received data available for the host to read. Software in the MOTE application handles any necessary protocols and reformatting, performs any necessary transformations on transmitted data, and effects error recovery for data transmission to and from the outside world.

For configurations of MOTE devices where there is no other host connection, a MOTE programmed as a host bus master controller is placed on the external bus. The MOTE host bus controller then implements VMSC requests to other MOTEs as needed, and other MOTEs in the configuration are behave as if they were attached to any other kind of host.

Applications software written for and delivered in a MOTE may implement any algorithm and access any I/O interface (other than direct access to the host external bus) which the hardware of the respective MOTE supports. To facilitate the writing of applications for use within the MOTE under its internal operating system, at least the services listed below are provided by that operating system via calls for the programming language being used, e.g., the C language. The following calls for service can be made to the MOTE process manager by an application:

| | |
|---|---|
| USE | reserve and open a file in VMSC |
| DROP | chose and release a file in VMSC |
| CREATE | initiate a new file |
| DELETE | remove a file from VMSC |
| COPY | make a copy in VMSC |
| GET | get the next record of a file in VMSC |

-continued

| | |
|---|---|
| PUT | put a record into a file in VMSC |
| POINT | position to specified data in a file in VMSC |
| READ | read bytes directly from a file in VMSC |
| WRITE | write bytes directly into a file in VMSC |
| SEARCH | find data by content in a file in VMSC |
| PULL | obtain data from the host bus through the MOTE synchronous conversational interface |
| PLACE | make data available to the host bus through the MOTE synchronous conversational interface |
| SEND | send a message to the logical bus within the MOTE |
| TAKE | obtain the next message from the queue of the logical process |
| SENDOUT | send a message to the logical bus within the MOTE |
| TAKEIN | obtain the next message from the input queue from the host |
| ALLOCATE | obtain a quantity of workspace in RAM |
| FREE | return a quantity of previously allocated memory |
| RESERVE | claim a resource |
| RELEASE | free a reserved resource |
| START | establish a new logical process in the MOTE |
| STOP | remove a logical process from the MOTE |
| SETTIME | set the MOTE real time clock |
| SETDATE | set the MOTE real time calendar |
| TIME | obtain current time |
| DATE | obtain current date |
| SERIAL | obtain MOTE serial number |
| LOG | make an entry in a journal file in VMSC |
| WHEN | establish the action to be taken when an exceptional event occurs |

Each MOTE 11, FIG. 1, contains a processing unit (CPU) 13 having processing capabilities comparable to a Motorola® 68xxx processor. An internal hardware bus 15 connects the CPU 13 to an internal non-volatile RAM 17, being at least 1 megabyte in total size and directly addressable only by CPU 13. (This non-volatile RAM space is partitioned by MOTE software into a workspace portion 17a exclusively for its own internal use and a Virtual Mass Storage Control (VMSC) portion 17b where files and folders of the virtual storage volume image presented to the host under strict control of the MOTE operating software are managed.) Workspace portion 17a is dedicated for use for internally stored software and internally stored data. The software and data held in workspace 17a of RAM 17 is invisible to a host and usable only by a MOTE CPU 13. A non-volatile ROM 19, addressable only by CPU 13, is also connected to the hardware bus 15. This ROM is also at least 1 megabyte in size and is used to hold MOTE operating system software and application-specific software.

Providing the CPU 13 with greater or lesser processing capabilities, providing the bus 15 at a different speed or byte width, and providing the RAM 17 and ROM 19 of larger or of smaller size will each to some degree impact upon the operational capabilities and the speed or throughput of a MOTE 11. These variations will not, however, alter the intent and function of a MOTE unit.

A battery-backed real time clock-calendar circuit 21 provides date and time to the CPU 13 via the hardware bus 15. A number (single or plurality) of input/output (I/O) devices 23, each having standardized interface hardware (connectors) and protocol may optionally be connected to the hardware bus 15 of any particular MOTE. These I/O devices 23 are structured to meet prevailing hardware interface specifications and permit the CPU 13 to communicate with peripheral devices and ports such as to an LED indicator, a manual switch, a serial I/O port, a parallel I/O port, a USB port, and others. An interrupt control circuit 25 connected to the hardware bus 15, monitors for power failure, power resumption, watchdog timeouts, bus faults, timeslice interrupts, I/O interrupts, and other defined event interrupts, signaling such interrupts to the CPU 13.

A host bus external I/O circuit 27 connects the MOTE internal hardware bus 15 to the external physical and electrical interface of a connectable external host bus 28 through a standard interface such as PCMCIA, CF™, SmartMedia™, MMC™, USB, IEEE 1394 (Firewire®) or other. This circuit 27 provides the connectable host bus 28 with a way to present read or write addresses and data for transfer from and to the VMSC of the MOTE (implemented by software and physically resident in non-volatile RAM 17) under strict software control of the CPU 13 and its operating software. The MOTE software manages the electronic signals on this interface in such a way as to emulate the passive mass storage interface of a prevailing standard external memory unit (e.g., PCMCIA, CF™, SmartMedia™, MMC™, USB, IEEE 1394 (Firewire®) or other) having a capacity as seen by he host which is determined by the space allocated under MOTE software control to VMSC in the non-volatile memory 17. Every byte of data and every addressing assignment exchanged between the host and the VMSC is handled under strict control of the MOTE operating software.

out in time-sliced, interrupt-preemptable multiprogramming within the MOTE which renders a MOTE as an internally ultra-modular and ultra-concurrent process manager implemented under software control. This ultra-modular and ultra-concurrent processing is carried out on input data messages from logical queues 35a–35n, respectively, where these queues 35a–n are normally assigned and sequenced in order, unless that order is programmably reassigned for reasons of priority. A re-circulating software bus 37 is implemented under a software bus algorithm by software bus control 38. Messages sent as output to the software bus 37 from logical processes 33a–33n are distributed by software bus control 38 to their respective destinations at logical queues 35a–35n for further processing, for I/O, etc. Logical queues 35a–35n for their respective logical processes 33a–33n are maintained in non-volatile workspace memory by the software bus control 38 on a priority basis. In general, software bus control 38 manages logical processes on a time-sliced round-robin basis but preempts the active process when an asynchronous hardware interrupt from any source is received.

Paul and Paul Docket
Attorney - US/Foreign

| Atty | US? | Reminder: | Action | Due: | File No.: | Client: | Country: |
|------|-----|-----------|--------|------|-----------|---------|----------|
| OSO | Yes | Aug. 31, 2002 | Check with Examiner re Allowance | Aug. 31, 2002 | 637-99 | Blumcraft | |
| | | Aug. 31, 2002 | Response Due | Aug. 31, 2002 | 263-00 | Southco | |
| | | Sep. 1, 2002 | Update Search for Penn Eng. | | SOU-6Y | | |
| | | Sep. 5, 2002 | Response (Final) | Sep. 5, 2002 | 812-00 | Southco | |
| | | Sep. 7, 2002 | IDS (was due Aug. 7, 2002) | Sep. 7, 2002 | 095-02 | Freehills | |
| | | Sep. 8, 2002 | Notice of Appeal Due | Sep. 8, 2002 | 263-00 | Southco | |
| | | Sep. 12, 2002 | IDS Due | Sep. 12, 2002 | 145-02 | | |
| | | Sep. 12, 2002 | Issue Fee Due | Sep. 12, 2002 | 178-01 | | |
| | | Sep. 12, 2002 | Response Due | Sep. 12, 2002 | 105-01 | Loglisci | |
| | | Sep. 12, 2002 | File Application | Sep. 12, 2002 | 218-02 | Southco | |
| | | Sep. 14, 2002 | Rem. Issue Fee & Dwgs. | Oct. 14, 2002 | 574-00 | Freehills | |
| | | Sep. 15, 2002 | Rem. Response | Oct. 15, 2002 | 092-01 | Southco | |
| | | Sep. 19, 2002 | Response Due | Sep. 19, 2002 | 874-00 | Aoki | |
| | | Sep. 22, 2002 | Rem. National Phase (30 months) | Oct. 22, 2002 | 093-01 | Southco | |
| | | Sep. 25, 2002 | Rem. National Phase (30 months) | Oct. 25, 2002 | 059-01 | | |
| | | Sep. 26, 2002 | Foreign Filing | Sep. 26, 2002 | 170-01 | Opel | |
| | No | Aug. 31, 2002 | Amend Abstract | Aug. 31, 2002 | 084-02 | Southco | PCT |
| | | Sep. 13, 2002 | Response Due | Sep. 13, 2002 | 596-00 | | Taiwan |
| | | Sep. 17, 2002 | Rem. Response | Oct. 17, 2002 | 074-01 | | China |

Figure 2:
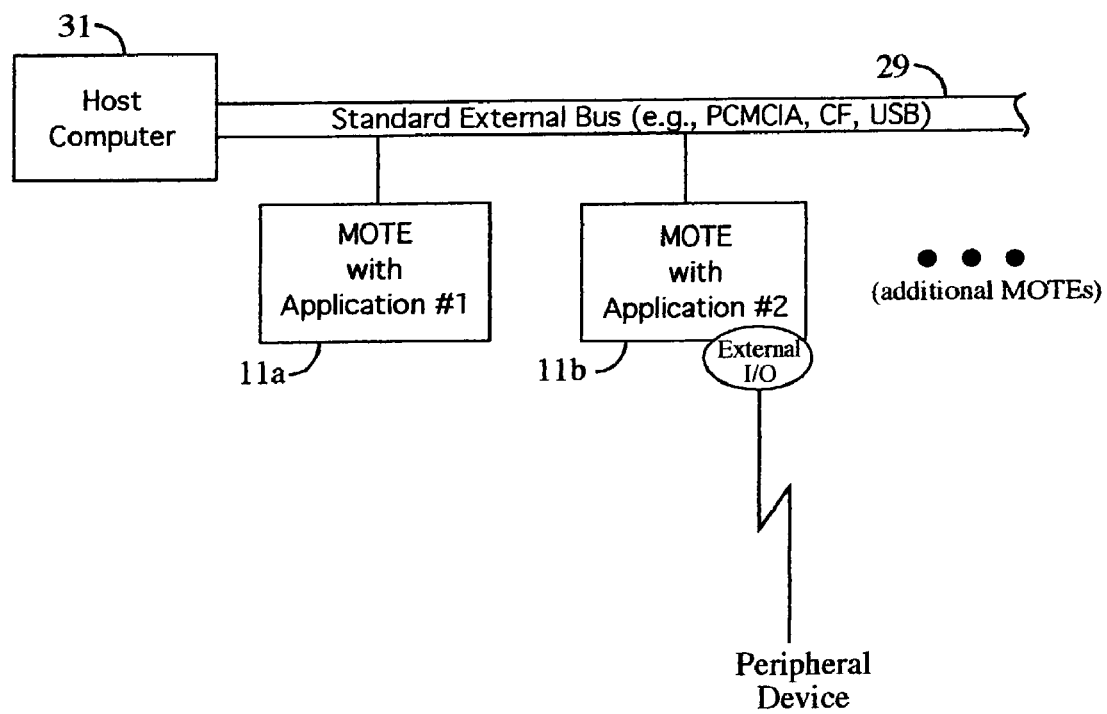
FIG. 2 is a functional block diagram of plural MOTE units connected to a host computer system through a standard external bus connection such as PCMCIA, CF, USB and others.

A plurality of MOTEs 11a, 11b, etc., in FIG. 2 having identical hardware architecture (except for the number and kind of their optional I/O circuits) are connectable to a standard external host bus 29 connected into a host computer system 31. This standard external host bus 29 meets prevailing standards for CF, PCMCIA, USB or other prevailing protocols. Each MOTE 11a, 11b, etc., is programmable to a specific application it is intended to carry on. Each MOTE 11a, 11b, etc., also projects virtual passive mass storage, i.e., VMSC, to the host 31.

Figure 3:
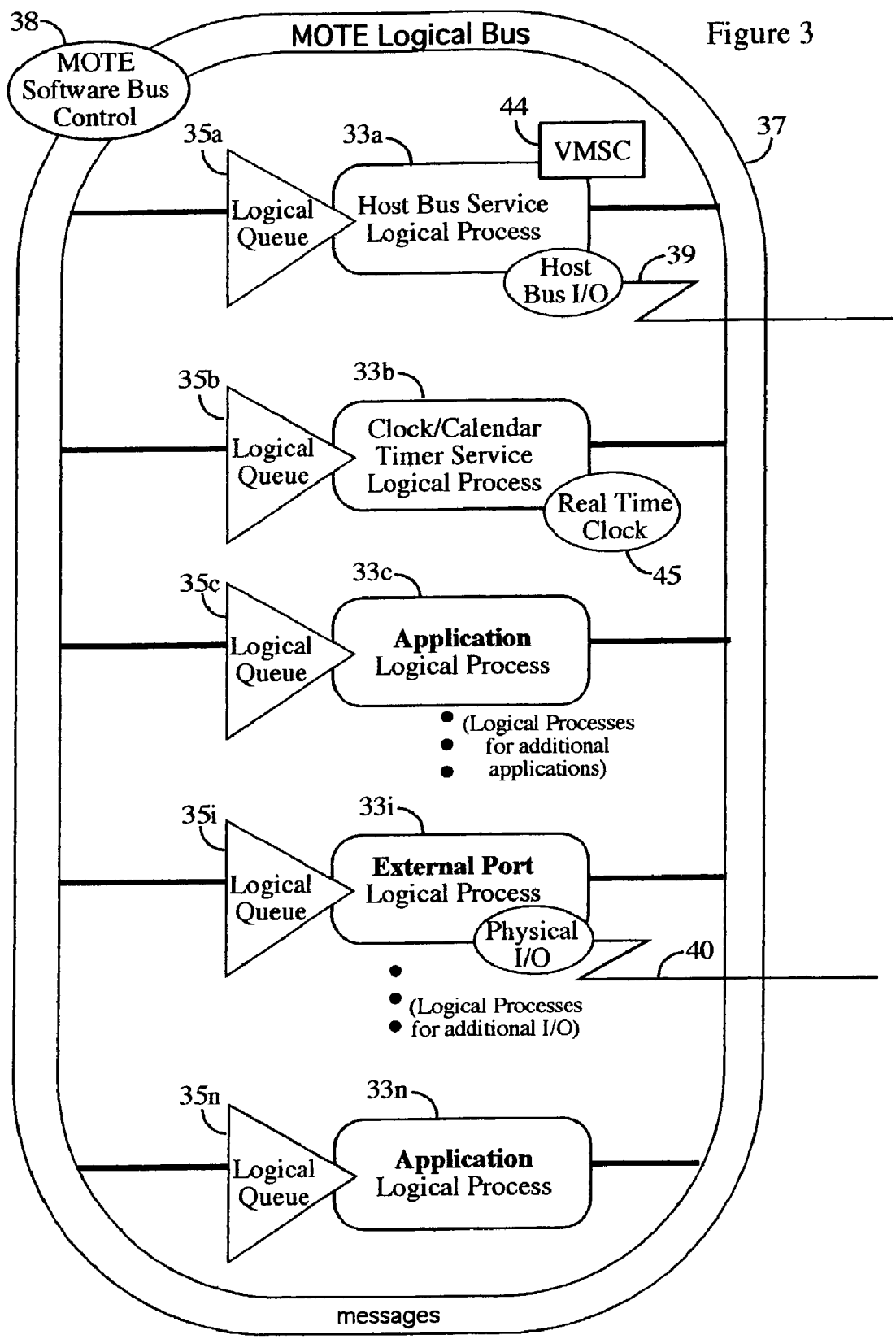
FIG. 3 is a block diagram for internal MOTE management (internal control program) operating under a circulating software bus algorithm.

The program management within each MOTE 11 unit, FIG. 1, is implemented under the MOTE's internal operating system, FIG. 3, which acts upon the internally programmed applications software present and active. These plurality of applications define a plural number of logical processes 33a–33n, respectively, with any and all being operational at any one time period. These processes 33a–33n are carried Noteworthy among the logical processes 33a–33n is the Host Bus Service logical process 33a which manages all interaction between the host on the host external bus 39 and the Virtual Mass Storage Control (VMSC) 44 of the MOTE. Every byte of data read or written and every address presented to interface 39 by the host must pass through the strict control of this process 33a. Due to the activities taking place within the MOTE, the MOTE CPU (FIG. 1, 13) may not be able to pass control to the Host Service Logical Process immediately upon a request by the host interface 39 for service, so the "busy" indicator on that interface is set while uninterruptible internal processing is underway and reset when the MOTE is able to respond to bus interrupts.

Also noteworthy is the Clock-Calendar Timer Service logical process 33b which accepts messages from its logical input queue which request the reading or updating of the real time clock-calendar hardware registers 45 and also processes requests to schedule the sending of a notification message to another logical process when a particular time on a particular day occurs.

Further noteworthy, logical process such as 33*i* defined for an optional external port 40 is dedicated to and manages all I/O on that port.

Figure 4:
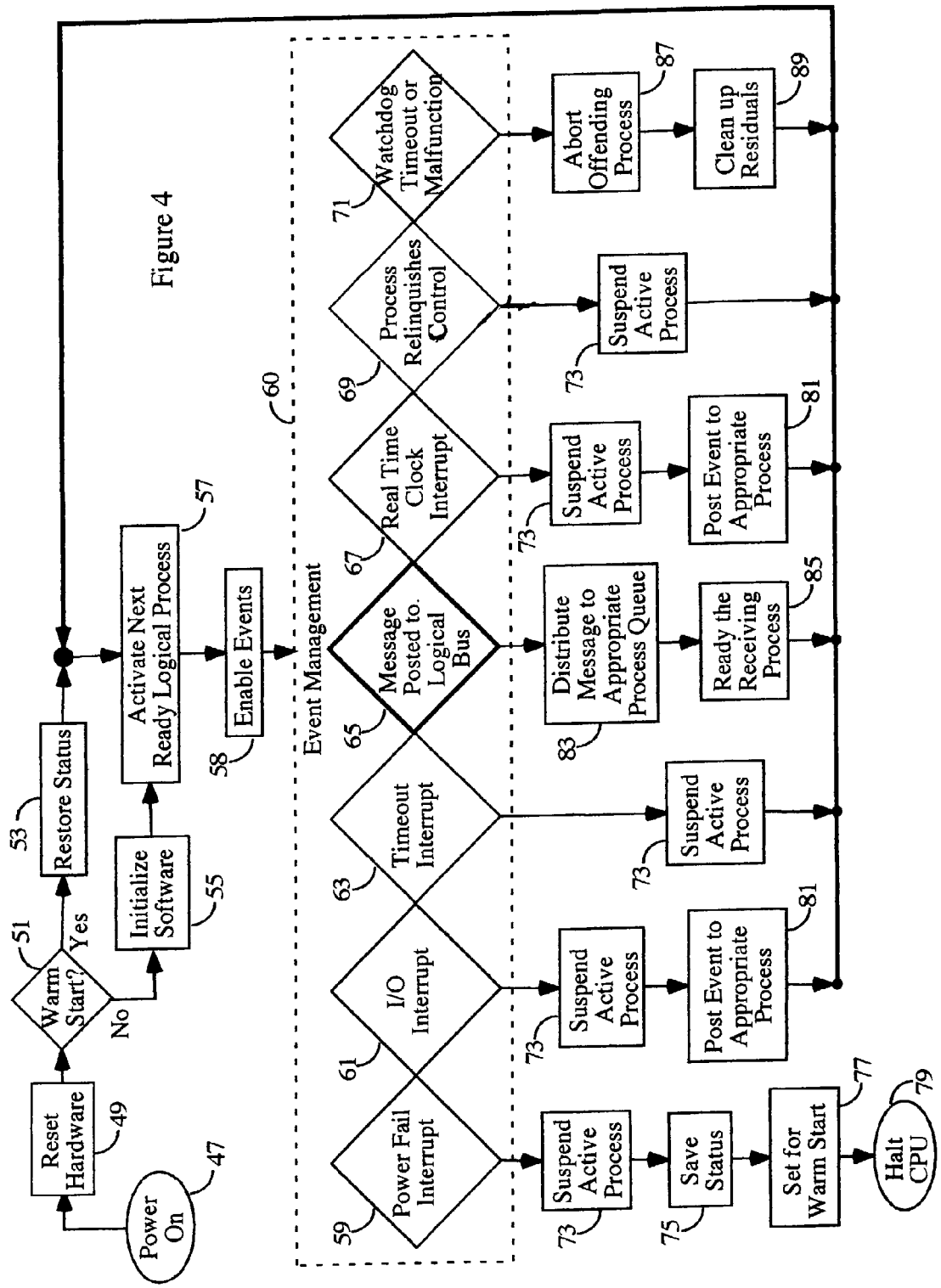
FIG. 4 is a logic flow diagram for MOTE internal program flow.

MOTE 11 internal control program has its program flow logic illustrated in FIG. 4. When power to the MOTE unit 11 goes on 47, i.e., by the MOTE 11 being plugged into a host external bus, the hardware circuits are reset and interrupts are disabled 49 and appropriate data fields in the non-volatile memory are queried for a warm start pending state 51. If there is to be a warm start, then the previous status of all logical processes 33*a*–33*n* and logical queues 35*a*–35*n* and the software bus control 38 are restored 53. If there is not a warm start, then workspace, process queues and logical processes are initialized, step 55. Once step 53 or 55 is finished the next ready logical process is activated, step 57, and hardware interrupts (events) are enabled, step 58.

The event manager is then entered 60 to await the next interrupt of one of the following kinds: power failure interrupt 59; I/O interrupt 61, timeout interrupt 63, message posted to logical bus 65, real time clock interrupt 67, request to relinquish control 69, and malfunction or watchdog timeout 71. In the event of a power failure 59, the active process is suspended 73 and its status saved 75, then the system control data fields are set for a warm start 77 and the CPU operation is halted 79. The other interrupts 61–71 eventually all result in a return to step 57, the activation of the next ready logical process step.

In the event of an I/O interrupt 61, the active process is suspended 73, and a posting of the event appropriate to the process suspended is made, step 81. The logic then returns to step 57. If a timeout interrupt is received 63, it indicates that a process timeslice has expired, so the active process is suspended, step 73, and the logic then returns to step 57. When a message is posted to the logical bus 65, that message is distributed to the appropriate logical process queue 35*a*–35*n* in step 83, and the receiving process is readied to resume, step 85, and then the logic returns to step 57. A real time clock interrupt 67 causes the active process to be suspended 73, and a posting of the scheduled event to the appropriate process, step 81. A return to step 57 then occurs.

When a process relinquishes control voluntarily, step 69, it is suspended 73 and the logic returns to step 57, the activation of the next ready logical process step. When a watchdog timeout or other recognizable malfunction is detected, step 71, the offending process is aborted 87, the residual data are cleaned-up, step 89, and the logic returns to step 57.

Figure 5:
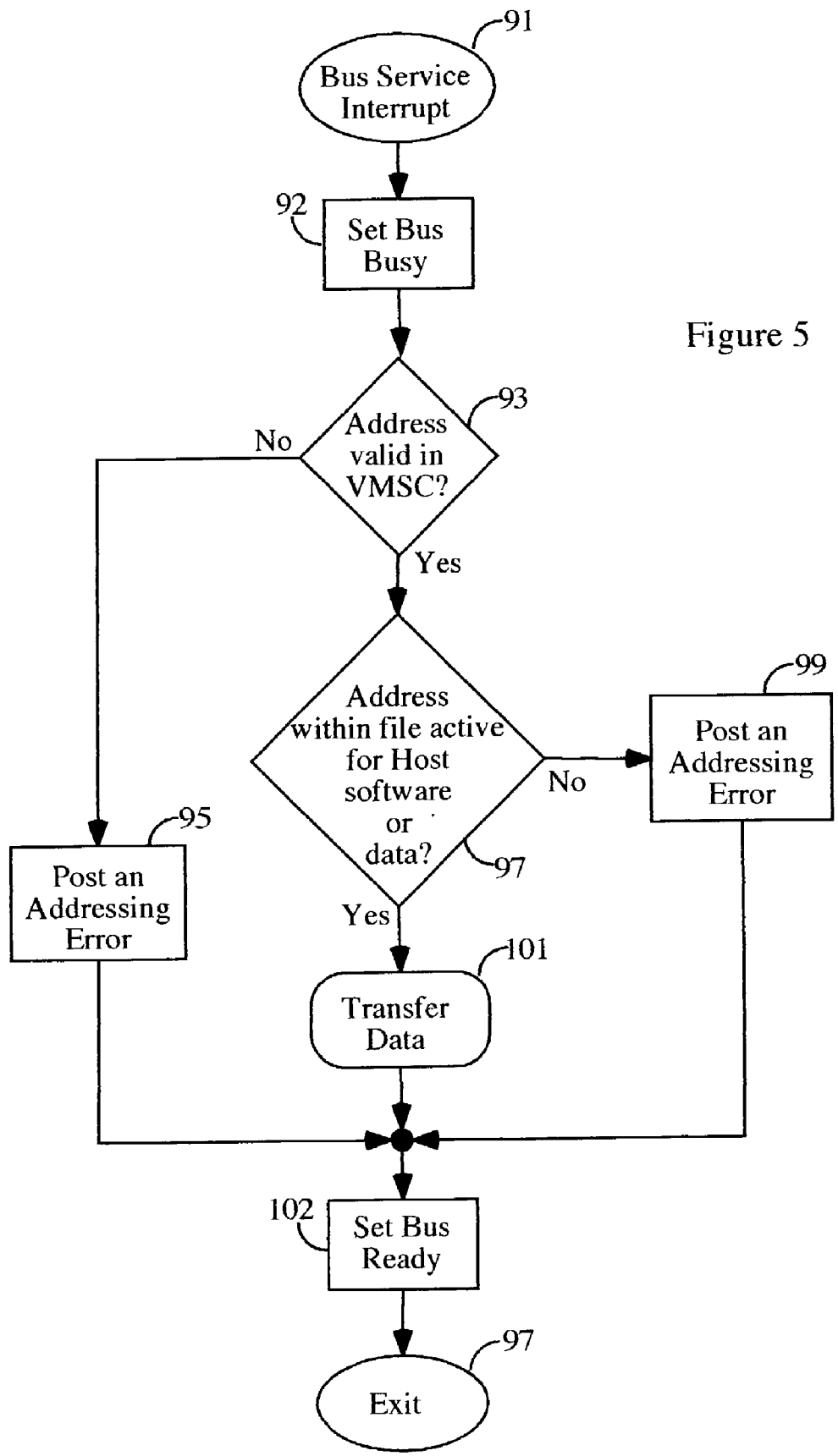
FIG. 5 is a logic flow diagram for management by the MOTE operating system of host bus access to shared memory.

FIG. 5 illustrates in greater detail some of the functions of the Host Bus Service logical process 33*a* to show the logic flow for managing the host bus queries carried on within a MOTE. A bus service interrupt is received, step 91, the "busy" indicator is set from the MOTE side 92, and the address presented by the host is checked for a valid VMSC location, step 93. If there is an error in the VMSC address, an addressing error is posted, step 95, and the process logic ends this routine 97. If a host requested address is valid as being within the VMSC area of RAM, then the address is accessed if it is within an active file for the host (or a software file or data file authorized for access by the host), step 97. If it is not, then an addressing error signal is posted, step 99. If the data address is valid, the data is transferred to or from that RAM address, step 101, the "bus:busy" indicator is reset, and the routine logic ends, step 97.

Figure 6:
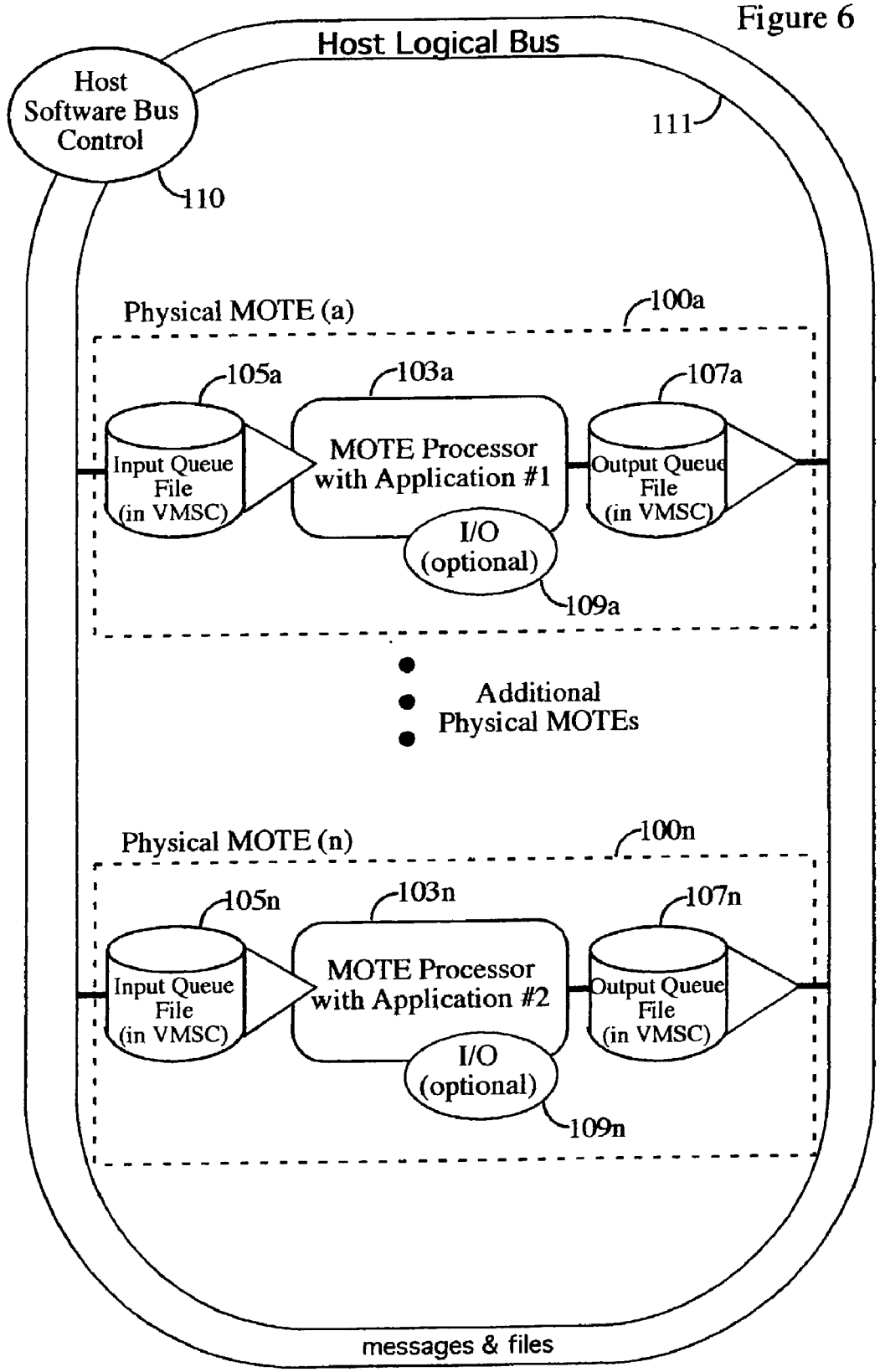
FIG. 6 is a block diagram for a lattice topology of plural MOTE units operating under a re-circulating logical (software) bus algorithm.

The implementation of the software lattice topology for a system of one or more MOTE units parallels the internal MOTE level algorithm. FIG. 6 illustrates a block diagram for the lattice topology for plural MOTE units 100*a*–100*n* operating as a host system network element under a re-circulating logical bus algorithm. In this host attachment topology there is a plurality of individually programmed MOTE processors 103*a*–103*n* respectively. Each MOTE 103*a*–*n* has a respectively associated input queue file in its own Virtual Mass Storage Control (VMSC) 105*a*–105*n*. Each MOTE 103*a*–*n* also has a respectively associated output queue files in its own VMSC 107*a*–107*n*, respectively. A dedicated I/O device, 109*a*–109*n*, may optionally be connected to any respective MOTE 103*a*–*n*. A host logical (software implemented) bus 111 under software control of the host 110 operates as a re-circulating information bus to make information available to each of the respective input queue files 105*a*–*n*, in turn for processing by the respective physical MOTEs 100*a*–100*n*, and to collect information from each respective output queue file 107*a*–*n*, sequentially and distribute it as necessary. Host software bus control 110 is also responsible for recognizing the removal or addition of physical MOTE units 100*a*–100*n*. (The physical connection of each MOTE 100*a*–100*n* to the host bus is not shown but is implied by the presence of VMSC access 105*a*–105*n* and 107*a* 107*n* respectively; this connectivity is also shown schematically in the block diagram of FIG. 2.)

Figure 7:
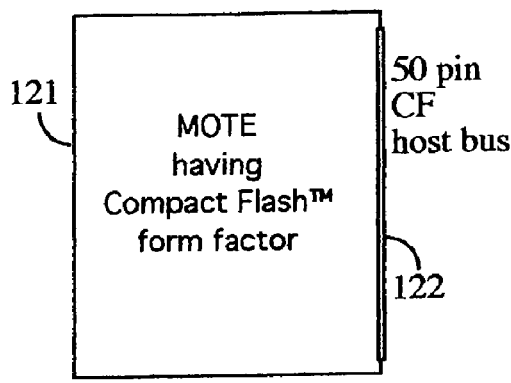
FIG. 7 shows examples of four of the form factors suitable for MOTE packaging.
Figure 7:
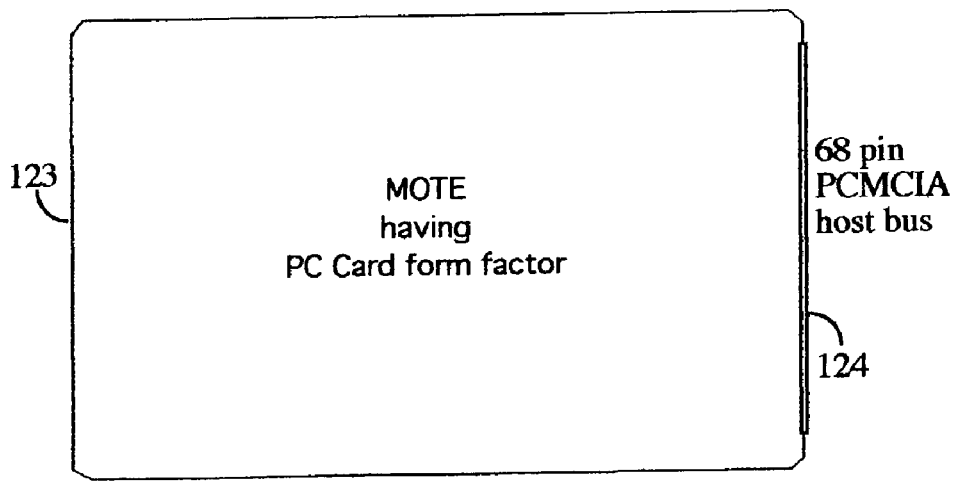
Figure 7:
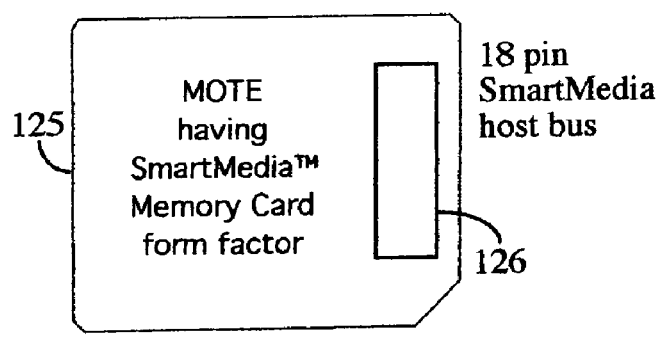
Figure 7:
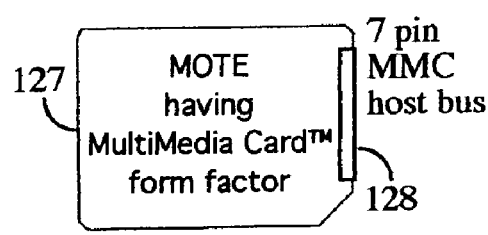
Figure 9:
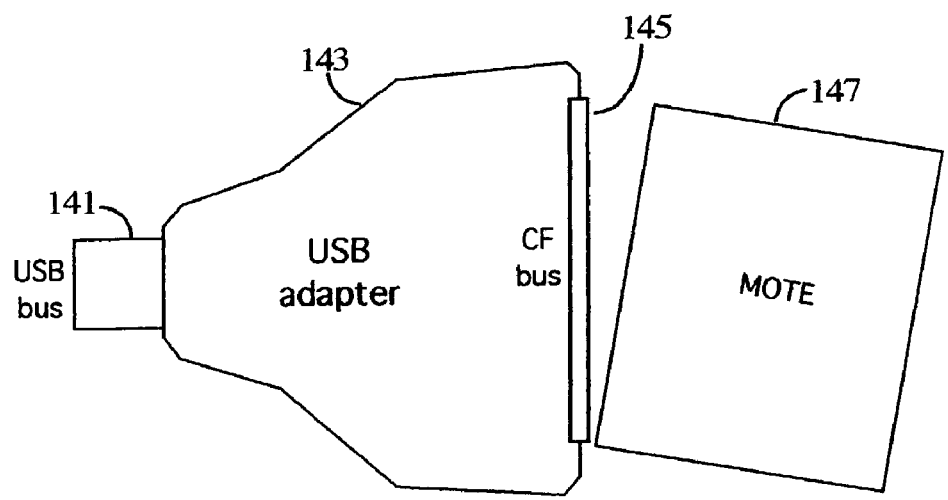
FIG. 9 shows two examples of adaptors which can be used with MOTEs in order to accommodate them to alternative host buses.
Figure 9:
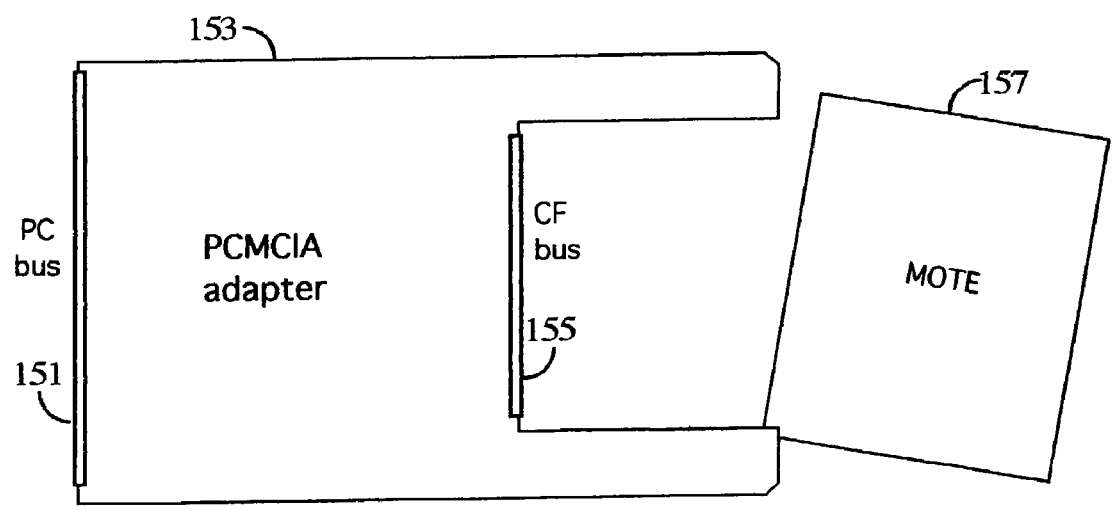

The form factors of some typical physical MOTE units are illustrated in FIG. 7. The Compact Flash™ form factor 121 is associated with an industry-standard 50 pin host bus interface 122. A PC card form factor 123 is associated with a 68 pin industry-standard PCMCIA host bus interface 124. A SmartMedia™ memory card form factor 125 is associated with an industry-standard 18 conductor host bus interface 126. A MultiMedia Card™ form factor 127 is associated with an industry-standard seven (7) conductor host bus interface 128. Each of these four interfaces is currently in use for passive mass storage cards in attachments with personal computers, laptop computers, personal digital assistants, digital cameras, appliances, instruments, vehicles, etc., and thus provides the physical and electronic bases for direct connection of a MOTE to a host (with host access to VMSC under MOTE software control) without modification to the host hardware or software.

Where several MOTEs are to be used together in parallel and concurrently, a hub device provides a base for their physical and electronic interconnection as shown in FIG. 8. A rectangular hub 131 or a circular hub 133 or other can be used. Such a hub provides supplementary power to the MOTE units 11*a*, 11*b*, etc., and an interface to an external host bus. If no host is connected to the hub, one of the MOTE units programmed as a host serves to control the host bus. In a hub, passive memory cards can be freely intermixed with MOTEs to provide additional mass storage capacity for a system. Consideration of a hub of MOTEs serves to highlight several advantages of the invention: external functional ultra-modularity in which can units can be assembled and re-configured at will by an end user, and ultra-concurrency of MOTE units operating in parallel.

Where one or more MOTE units are to be physically and electronically attached to a host bus which is not directly compatible with the physical interfaces of the respective MOTEs, adapters may be used as shown in FIG. 9. For example, a MOTE having a CF host bus 147 may be plugged into a CF-compatible interface 145 of a CF-to-USB adapter 143 which may in turn be plugged into a host USB port via connector 141. Similarly, a MOTE having a CF host bus 157 may be plugged into a CF-compatible interface 155 of a CF-to-PCMCIA adapter 153 which may in turn be plugged into a host PC card port via connector 151. Industry-standard adapters are commercially available for CF-to-USB, Smart-Media-to-USB, MMC-to-USB, PCMCIA-to-USB, CF-to-PCMCIA, SmartMedia-to-PCMCIA, and others. In all of these configurations, the MOTE appears to the host as a passive mass storage volume due to the software within the MOTE and to the standard software presently available which manages the host side of the interface.

Many changes can be made in the above-described invention without departing from the intent and scope thereof. It is therefore intended that the above description be read in the illustrative sense and not in the limiting sense. Substitutions and changes can be made while still being with the scope of the appended claims.

What is claimed is:

1. A computing element, comprising:
    a first storage area operable to receive and store input data and output data, wherein the input data comprises data received from an external host device for peripheral processing;
    a second storage area comprising an application program having a predetermined function, wherein the application program is operable to apply the predetermined function to the input data to generate the output data, wherein the output data comprises a transformation of the input data by the predetermined function;
    a processor operable to execute the application program on the input data and generate the output data based on the predetermined function;
    a host bus control module operable to manage access to the first storage area and the second storage area, the host bus control module having control software executable by the processor to restrict an external host device to writing the input data to and reading the output data from the first storage area, the control software further executable to prevent access by the external host to the second storage area such that the computing element appears as a passive mass storage device to the external host device, and
    wherein the application program further comprises:
    a plurality of processes, wherein each one of the plurality of processes is operable to receive a process input data message and perform a predetermined process function to generate a process output data message;
    a plurality of queues, wherein each one of the plurality of queues is connected with one of the plurality of processes and operable to receive and transfer the process input data message to the respective one of the plurality of processes; and
    a software bus interconnecting each of the plurality of queues and each of the plurality of processes, the software bus executable by the processor to receive and deliver the respective process output data message to a predetermined one of the plurality of queues as the respective process input data message, wherein one of the process input data messages comprises the input data, and wherein one of the process output data messages comprises the output data.

2. The computing element of claim 1, wherein the host bus control module further comprises a host bus external input/output circuit that defines an interface between the first storage area and the external host device, wherein the control software is further executable to manage electronic signals on the interface to emulate the passive mass storage device.

3. The computing element of claim 1, wherein each of the first storage area and the second storage area have a plurality of addresses, wherein the host bus control module is further operable to receive a host bus query from the external host device, the host bus query requesting access to an address, and wherein the control software further comprises a control process executable to deny access by the external host device to any of the plurality of addresses within the second storage area and allow access by the external host device to any of the plurality of addresses within the first storage area by respectively denying and allowing the host bus query based on a location of the requested address.

4. The computing element of claim 3, wherein the input data comprises the host bus query.

5. The computing element of claim 1, wherein the input data comprises an input message file generated by a shell driver operating in the host, the shell driver corresponding to the application program.

6. The computing element of claim 1, wherein each of the plurality of processes are concurrently operable.

7. The computing element of claim 1, wherein the plurality of processes include at least one of an operating system internal process, a host bus management process, a scheduling application events process, an exceptions handling process, and an external port peripheral device communications management process.

8. The computing element of claim 1, further comprising monitoring software operable to continually monitor at least one of the first storage area and the second storage area to maintain the integrity of at least one of the input data, the output data, and the application program.

9. A method of providing additional processing capability to an external host computer device, comprising:
    presenting a passive mass storage volume to the external host computer device;
    restricting the external host computer device to writing input data to and reading output data from a first storage area presented as the passive mass storage volume;
    preventing access by the external host to a second storage area in communication with the first storage area;
    receiving the input data from the external host computer device in the first storage area, wherein the input data comprises data for peripheral processing;
    executing an application program on the input data, the application program residing in the second storage area and comprising a predetermined function, wherein the application program is operable to apply the predetermined function to the input data to generate output data, wherein the output data comprises a transformation of the input data by the predetermined function;
    generating the output data based on the predetermined function applied to the input data;
    storing the output data in the first storage area for access by the external host computer device; and
    wherein executing the application program further comprises:
    receiving at least one process input data message at one of a plurality of queues and transferring the respective process input data message to a predetermined one of a plurality of processes;
    performing a predetermined process function to generate a respective process output data message at the predetermined one of the plurality of processes; and delivering the respective process output data message via a software bus to a predetermined one of the plurality of queues as the respective process input data message, wherein one of the process input data messages comprises the input data, and wherein one of the process output data messages comprises the output data.

10. The method of claim 9, wherein the input data comprises an input message file generated by a shell driver operating in the external host computing device, the shell driver corresponding to the application program.

11. The method of claim 9, wherein presenting the passive mass storage volume further comprises providing an interface between the first storage area and the external host computer device, and managing electronic signals on the interface to emulate the passive mass storage volume.

12. The method of claim 9, wherein the first storage area and the second storage area each have a plurality of addresses, wherein the restricting action and the preventing action further comprise receiving a host bus query from the external host computer device, the host bus query requesting access to an address, and denying access by the external host device to any of the plurality of addresses within the second storage area and allowing access by the external host device to any of the plurality of addresses within the first storage area by respectively denying and allowing the host bus query based on a location of the requested address.

13. The method of claim 9, wherein performing the predetermined function further comprises concurrently performing the predetermined function at the predetermined ones of the plurality of processes.

14. The method of claim 9, further comprising monitoring at least one of the first storage area and the second storage area to maintain the integrity of at least one of the input data, the output data, and the application program.

15. A system for processing data, comprising:
a host computer device comprising an externalmbus and a shell driver, the external bus operable to provide an input/output interface with the host computer device, the shell driver corresponding to a predetermined application program and operable to generate an input message file, wherein the input message file comprises data for peripheral processing;
a computing element for assisting the host computer device in processing data, the computing element comprising:
a first storage area operable to receive and store the input message file and a result file corresponding to the input message file;
a second storage area comprising the predetermined application program comprising a predetermined function, wherein the application program is operable to apply the predetermined function to the input message file to generate the result file, wherein the result file comprises a transformation of the input message file by the predetermined function;
a processor operable to execute the application program on the input message file and generate the result file based on the predetermined function;
a host bus control module operable to manage access to the first storage area and the second storage area, the host bus control module comprising a host bus external input/output circuit removably connectable with the external bus of the host computer for transferring data, the host bus control module further comprising control software executable by the processor to restrict the host computer device to writing the input message file to and reading the result file from the first storage area, the control software further executable to prevent access by the host computer device to the second storage area such that the computing element appears as a passive mass storage volume to the host computer device; and
wherein the application program further comprises:
a plurality of processes, wherein each one of the plurality of processes is operable to receive a process input data message and perform a predetermined process function to generate a process output data message;
a plurality of queues, wherein each one of the plurality of queues is connected with one of the plurality of processes and operable to receive and transfer the process input data message to the respective one of the plurality of processes; and
a software bus interconnecting each of the plurality of queues and each of the plurality of processes, the software bus executable by the processor to receive and deliver the respective process output data message to a predetermined one of the plurality of queues as the respective process input data message, wherein one of the process input data messages comprises the input data, and wherein one of the process output data messages comprises the output data.

16. The system of claim 15, wherein the control software is further executable to manage electronic signals on the host bus external input/output circuit to emulate the passive mass storage volume.

17. The system of claim 15, wherein each of the first storage area and the second storage area have a plurality of addresses, wherein the host bus control module is further operable to receive a host bus query from the host computer device, the host bus query requesting access to an address, and wherein the control software further comprises a control process executable to deny access by the host computer device to any of the plurality of addresses within the second storage area and allow access by the host computer device to any of the plurality of addresses within the first storage area by respectively denying and allowing the host bus query based on a location of the requested address.

18. The system of claim 15, wherein the computing element comprises a first one of a plurality of independent computing elements, wherein the predetermined application program comprises a first one of a plurality of application programs each having one of a plurality of predetermined functions, wherein each of the plurality of computing elements is associated with one of the plurality of application programs, wherein the input message comprises a first one of a plurality of input messages generated by the shell driver and received by at least a portion of the plurality of computing elements, wherein each of the plurality of computing elements are operable to independently and concurrently process a received one of the plurality of input messages to define a distributed processing system to assist the host computer device in processing data.

* * * * *